United States Patent [19]

Scott

[11] Patent Number: 4,869,601

[45] Date of Patent: Sep. 26, 1989

[54] BEARINGS AND SEALS

[75] Inventor: Peter A. J. Scott, Rugby, England

[73] Assignee: T&N Technology Limited, Rugby, England

[21] Appl. No.: 217,678

[22] Filed: Jul. 11, 1988

[30] Foreign Application Priority Data

Jul. 13, 1987 [GB] United Kingdom ............... 8716481

[51] Int. Cl.$^4$ ............................................. F16C 32/06
[52] U.S. Cl. ..................................... 384/100; 384/104; 384/152
[58] Field of Search ....................... 384/100, 103–106, 384/114, 117, 119, 125, 152

[56] References Cited

U.S. PATENT DOCUMENTS

| 3,765,732 | 10/1973 | Watt | 384/104 |
| 3,827,766 | 8/1974 | Watt | 384/104 |
| 4,514,099 | 4/1985 | John et al. | 384/100 |

FOREIGN PATENT DOCUMENTS 2460237  7/1975  Fed. Rep. of Germany ...... 384/103

Primary Examiner—Thomas R. Hannon
Attorney, Agent, or Firm—William R. Hinds

[57] ABSTRACT

Hydrostatic journal bearing assemblies are described which include a housing member having a generally circular bore therethrough, a journal bearing member having a bore therethrough for the support of a shaft, the journal bearing member being located within the bore of the housing wherein the journal bearing member comprises at least one generally annular sleeve portion, an increased diameter flange portion at the axially inner end of the journal bearing member, the journal bearing member being sealed against the ingress of pressurized fluid into a space between the bore of the housing member and the outer surface of the annular sleeve portion, the annular sleeve portion being pivotally supported intermediate the axially outer end of the journal bearing member and the flange portion and the bearing member having means for access of a source of pressurized fluid between the bore of the journal member and the shaft to be supported.

13 Claims, 4 Drawing Sheets

BEARINGS AND SEALS

The present invention relates to journal bearings and journal seals and particularly though not exclusively to hydrostatic journal bearings and seals.

Hydrostatic bearings used for example in spindles for machine tools, liquid sealed compressors and turbo machinery are usually provided with a separate pumped high pressure oil supply where the supply pressure is in excess of the specific load on the bearings. Such bearings have restrictors in the oil supply line to ensure that the supply pressure is always in excess of that immediately downstream of the restrictor. Restrictors often take the form of small holes of about 100 to 500 micrometers in diameter. These holes may become blocked due to their small size and lead to bearing failure. Such bearings are also expensive to manufacture.

It is an object of the present invention to provide a hydrostatic journal bearing which does not require the provision of oil supply line restrictors to ensure that oil films of high radial stiffness are maintained under all operating conditions.

It is a further object to provide a bearing which is more easily manufactured and consequently cheaper than known hydrostatic bearings.

It is a yet further object to provide a journal type bearing which may also act as a fluid seal.

According to the present invention a journal bearing assembly includes a housing member having a generally circular bore therethrough, a journal bearing member having a bore therethrough for receiving a shaft, the journal bearing member being located within the bore of the housing wherein the journal bearing member comprises at least one generally annular sleeve portion, an increased diameter flange portion at the axially inner end of the journal bearing member, the journal bearing member being sealed against the ingress of pressurised fluid into a space between the bore of the housing member and the outer surface of the annular sleeve portion, the annular sleeve portion being pivotally supported intermediate the axially outer end of the journal bearing member and the flange portion and the bearing member being adapted for access of pressurised fluid between the bore of the journal member and the shaft surface.

In one embodiment of the present invention the journal bearing member comprises two annular sleeve portions having a flange portion disposed intermediate the axial extremities of the two annular portions. The journal bearing member of this embodiment may be constructed as a single unitary machining or may comprise two distinct members where the flange portions are adjacent.

A bearing assembly may comprise two journal bearing members wherein the bearing surfaces are of different diameters. In this case the bearings may be arranged on a stepped diameter shaft to provide a net thrust load on the shaft, for example, to counteract the end thrust on the shaft from the apparatus in which it is mounted. Thus a much smaller thrust bearing may be employed than would otherwise be the case.

The flanged portion or portions may conveniently be sealed against an inner radially extending face of the housing member by means of an 'O' ring seal, for example. The 'O' ring seal may be housed either in a groove in the flange member per se or in a bearing ring made of a low-friction plastics material attached to the flange portion. Alternatively the 'O' ring may be accommodated in a similar manner in the housing member. Other types of sliding seal may be employed.

The bearing of the invention may be operated with either gas or liquid as the fluid shaft support medium.

In order that the present invention may be more fully understood examples will now be described by way of illustration only with reference to the accompanying drawings of which:

Figure 6:
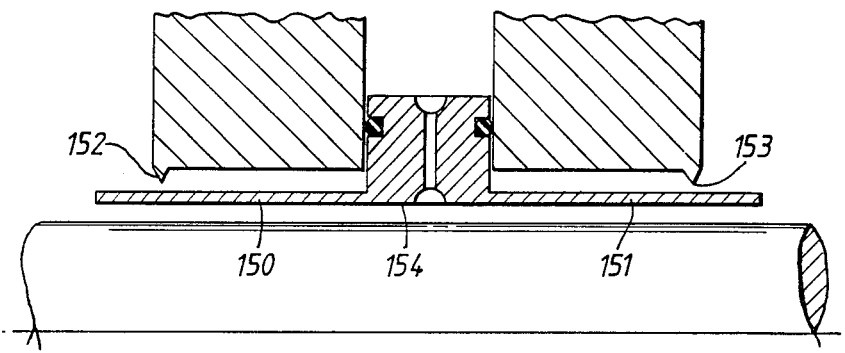
FIG. 6 shows an alternative arrangement to FIG. 1 in the unpressurised condition.
Figure 7:
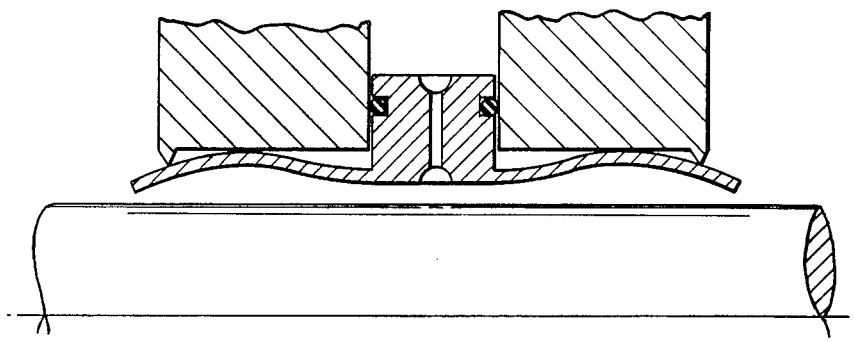

FIG. 7 which shows the bearing of FIG. 6 in the pressurised condition.

Figure 1:
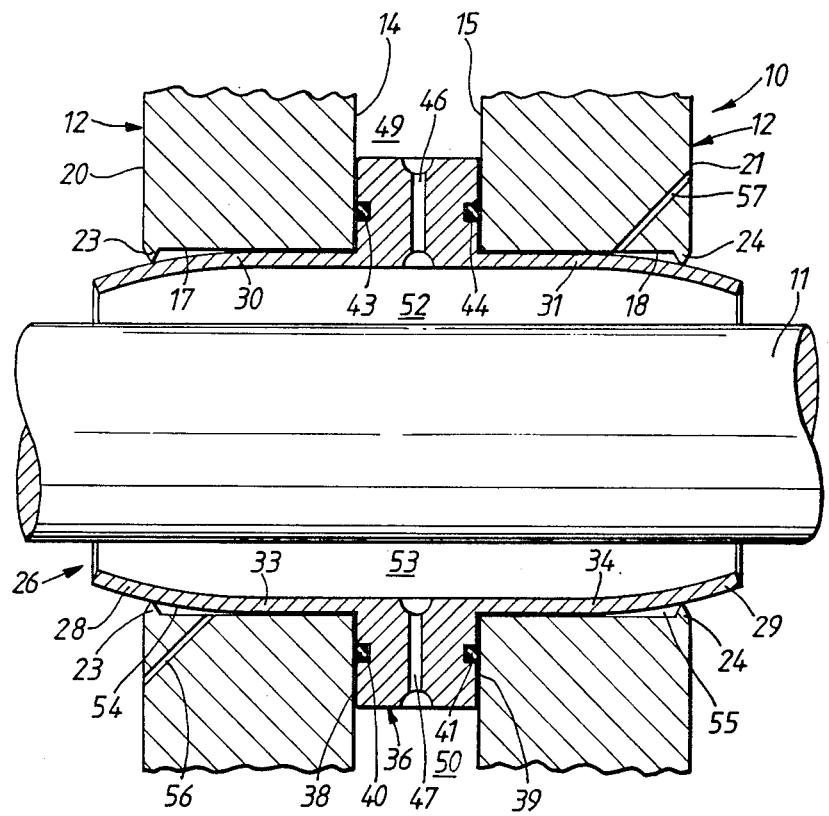
FIG. 1 shows a section in elevation of a schematic representation of a bearing assembly according to the present invention in the free state, i.e., with no oil pressurisation.
Figure 2:
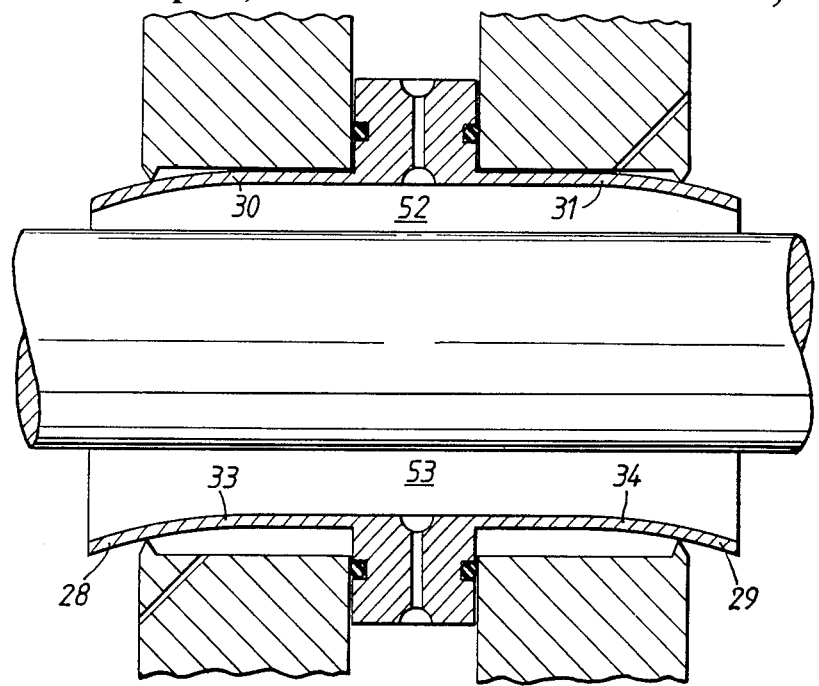
FIG. 2 shows the bearing of FIG. 1 with shaft loading.
Figure 3:
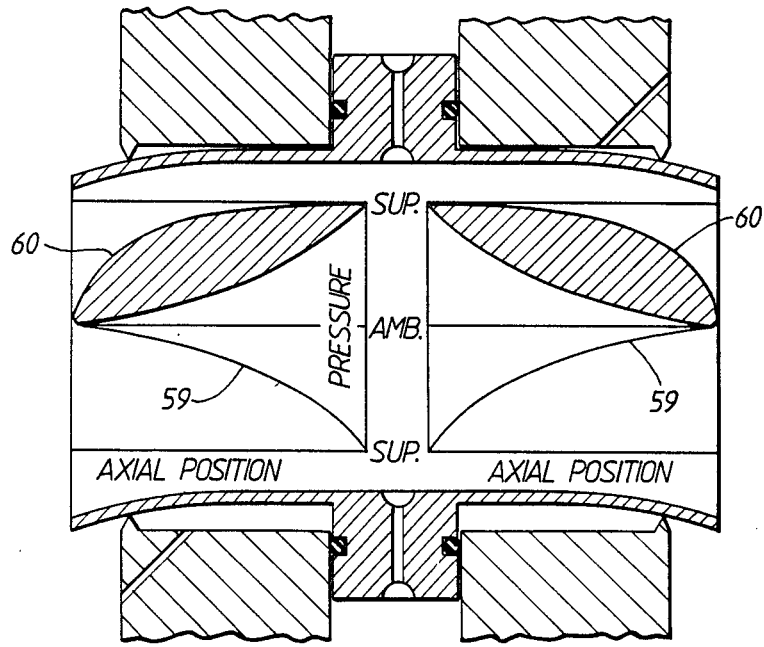
FIG. 3 shows the bearing of FIG. 2 with a diagram superimposed thereon showing the oil pressure distribution within the bearing.

Referring now to FIGS. 1 to 3 and where the same features are denoted by common reference numerals.

A bearing assembly is denoted generally at 10 for the support of a shaft 11. The assembly comprises a housing member 12 (shown only in part) having internal side faces 14 and 15 and bores 17 and 18. At the axially outer ends 20 and 21 of the housing there are internal annular projections 23 and 24 in the bores. Contained within the housing member 12 is a journal bearing member shown generally at 26. The bearing member 26 comprises two annular sleeve portions 28 and 29. In the section shown the upper portions 30 and 31 and the lower portions 33 and 34 of the annular sleeve portions 28, 29 are also distinguished for reasons which will become apparent below. Between the two sleeve portions 28, 29 is a flanged portion 36 having side faces 38 and 39 which have annular grooves 40 and 41 housing 'O' ring seals 43 and 44. Conduits 46 and 47 are provided in the flange portion 36 to allow access of a pressurized oil supply from the areas 49 and 50 to the clearances 52 and 53 between the bores of the sleeve portions 38 and 29 and the surface of the shaft 11. The clearances in this case are shown grossly exaggerated. The spaces 54 and 55 between the outer surfaces of the sleeve portions 28 and 29 and the bores 17 and 18 of the housing 12 are maintained at ambient pressure by means of vents 56, 57.

In FIG. 1 the bearing assembly is shown without a pressurized oil supply. The sleeve portions 28 and 29 have a constant bore diameter in their free state after machining. When the bearing member 26 is assembled into the housing 12 the inwardly turned projections 23 and 24 constrain the cylindrical annular sleeve portions 28 and 29 into a slightly "barrelled" configuration and which is shown greatly exaggerated in FIG. 1.

FIG. 1 also shows the bearing with a pressurized oil supply of Psup but no net radial load in any direction on the shaft 11. Due to both the constraint by the projections 23, 24 and to the pressure distribution within the clearances 52 and 53 the two annular portions 28, 29 exhibit a curved form as they are forced to pivot about the projections 23 and 24. The effect of the curvature is to decrease the gap at the axially outer ends of the sleeve portions. When there is no load on the shaft it is maintained in a substantially central position within the bearing bores. The seals 43 and 44 prevent oil from entering the spaces 55 and 56 which are also vented to ambient pressure, thus the axially inner portions of the sleeves 28 and 29 are able to expand due to the net positive pressure in the clearances 52 and 53. It will be appreciated that the various clearances and deflections shown are all greatly exaggerated.

The change in net load on the bearing changes the pressure distribution in the fluid film, because the entry and exit pressures are fixed at Psup and ambient respectively. In the loaded portion 52 the pressure distribution will integrate to a higher load and in the unloaded region 53, the load will be decreased. The fluid film shape must alter in clearances 52 and 53 to generate these changes in pressure distribution. A higher film load will be generated by an increase in film convergence and a lower film load will be generated by a decrease in film convergence. "Convergence" may be defined as the ratio of inlet to outlet or exit film thicknesses. It is also known that the load carrying capacity of a hydrostatic film is primarily dependent upon the convergence of the film and less so on the intervening film shape.

This change in convergence can be achieved in known bearings merely by reducing the minimum separation of the two facing surfaces if they are rigid. In the present invention the change in convergence is achieved by arranging for the bearing surfaces to distort elastically without necessarily changing the minimum separation. Thus in the loaded upper portions 30 and 31 the bearing sleeves become more "barrelled" and the unloaded portions 33 and 34 tend to "flatten-out" in response to the change in loading. The term "flatten-out" is used to cover the situation when the apparent shape of the lower portions 33, 34 ranges from concave (to the shaft), through flat to convex. The degree of deflection will depend upon the applied external load on the shaft.

The pressure distribution is shown schematically in FIG. 3. The horizontal axis indicates the axial position in the bearing whilst the vertical axis indicates the oil pressure, ranging from ambient at the axially outer end up to the supply pressure, Psup which may be between 100 and 10,00 p.s.i., in the center of the bearing.

In the clearance 52 because of the bearing deflection the pressure distribution follows the type of curve shown at 60, the hatched areas representing the net pressure supporting the load on the shaft.

Figure 4:
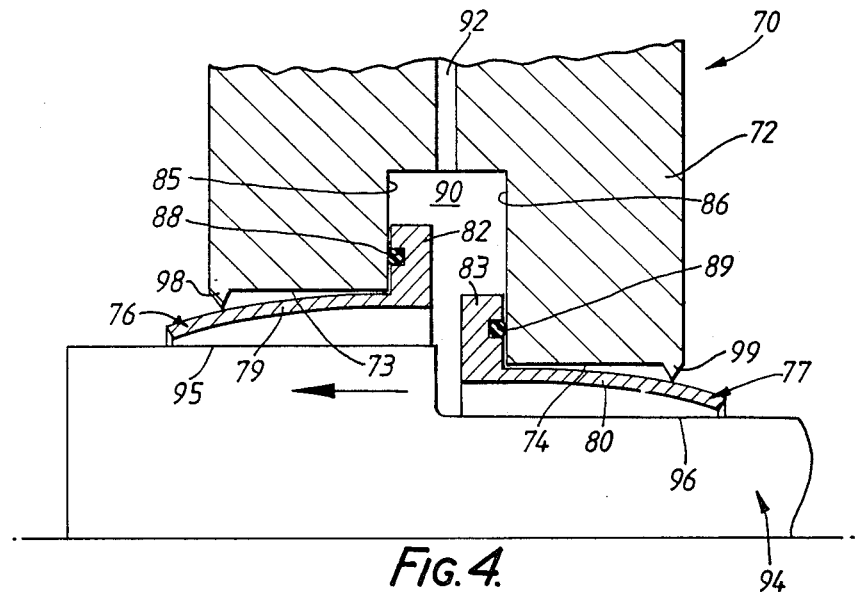
FIG. 4 shows a section through half of a schematic bearing assembly according to the present invention for producing end thrust in a shaft.

FIG. 4 shows a bearing construction able to produce a net end load on the shaft. The bearing assembly is shown generally at 70 and comprises a housing member 72 (shown in part) having two bores 73 and 74 of different diameters. Two journal bearing members 76 and 77 are in the housing 72. The journal bearing members have annular portions 79 and 80 and flanged portions 82 and 83. The flanged portions are sealed against the faces 85 and 86 of the housing by means "O" ring seals 88 and 89 thus preventing oil from entering the space between the housing bores 73 and 74 and the outer surfaces of the annular sleeve portions 79 and 80. High pressure oil is admitted to the annular space 90 via the conduit 92. A shaft 94 having journal diameters 95 and 96 is supported by the bearing assembly 70. The sleeves 79 and 80 are able to deflect, depending upon the supplied fluid pressure, about the projections 98 and 99 in a similar manner to that described with reference to FIGS. 1 to 3. Because of the twin diameter of the shaft and the oil pressure in the annular space 90 there is a net axial load in the direction of the arrow. This feature may, therefore, be used to counteract, diminish or reverse the direction of any axial thrusts which may exist in the equipment in which the bearing is fitted.

Where the diameter differences of a shaft are relatively small the journal bearing member may be formed as a single piece machining rather than as two separate members 76, 77 as shown in FIG. 4.

Figure 5:
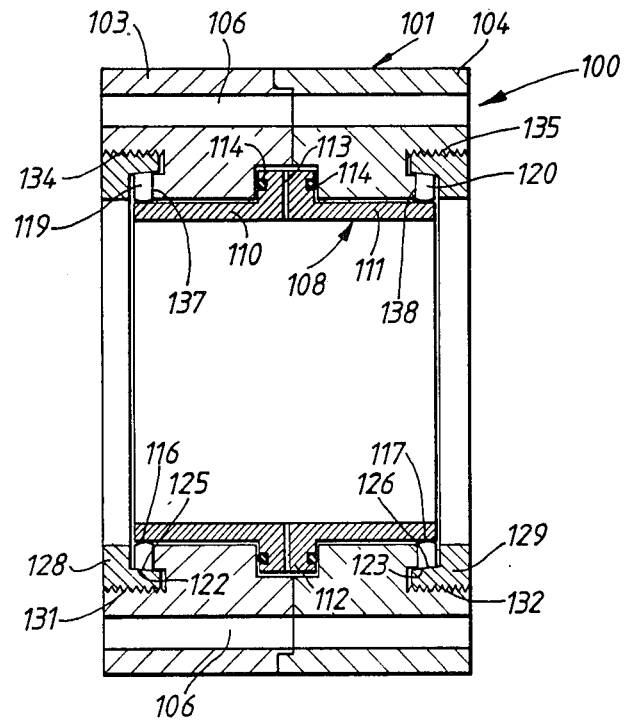
FIG. 5 shows a section through a practical construction of a bearing assembly according to the present invention.

FIG. 5 shows a practical construction of bearing assembly shown generally at 100. The assembly comprises a housing member 101 formed in two parts 103 and 104 and secured together by nuts and bolts (not shown) which pass through holes 106. A journal bearing member 108 having two annular sleeve portions 110 and 111, a flanged portion 112 and oil access conduit 113 is located in the housing. The flanged portion is sealed with 'O' rings 114 within the housing in a similar manner to that described with reference to the previous figures above. Projections 116 and 117 are formed by two radially split rings 119 and 120 which have shallow tapers on the faces 122 and 123. The tapered faces 122, 123 co-operate with tapered faces 125 and 126 on rings 128 and 129 having screw-threads 131 and 132 on their outer diameters and which screw-threads co-operate with screw-threads 134 and 135 in the housing 101. The rings 119, 120 are located axially on faces 137 and 138 in the housing 101. The internal diameters of the rings 119, 120 may be controlled by the screw-threaded rings 128, 129 via the tapered faces 125, 126.

The manner of operation of this bearing is essentially similar to that described above.

In its free state (i.e. without oil pressurization) the journal bearing member 108 may be pre-loaded in that a curved or "barrel" formed bearing rather than a straight or cylindrical shape may be the starting point. This may be achieved in the construction of FIG. 5 by means of the screw-threaded rings 128, 129.

The degree of pre-load described above may extend to the axially outer ends of the journal bearing members almost touching the shaft.

The axial extent of the flanged portion, the radial clearance and the initial barrelling may be chosen to produce extremely high minimum oil or gas film stiffnes over a desired load range to suit the applied loads.

FIGS. 6 and 7 illustrate the case where there is an initial clearance between the outer diameters of the bearing sleeve portions 150, 151 and the projections 152, 153 (i.e. where the bearing sleeves are not initially constrained into a slight barrel shape on assembly). When the bearing is pressurized by the applied fluid pressure it may adopt an "hourglass" shape (FIG. 7). This shape will, of course, become deformed in the presence of an applied external load to the shaft. The central portion 154 which is coterminous with the axial thickness of the flange will remain substantially parallel to the shaft surface.

The journal bearing member may be formed of any suitable material such as, for example, stainless steel. In some applications utilising lower fluid pressures plastics materials may be employed.

I claim:

1. A journal bearing assembly, the assembly including a housing member having a generally circular bore therethrough, a journal bearing member having a bore therethrough for receiving a shaft, the journal bearing member being located within the bore of the housing wherein the journal bearing member comprises at least one generally annular sleeve portion, an increased diameter flange portion at the axially inner end of the journal bearing member, the journal bearing member being sealed against the ingress of pressurized fluid into a space between the bore of the housing member and the outer surface of the annular sleeve portion, the annular sleeve portion being pivotally supported intermediate the axially outer end of the journal bearing member and the flange portion and the bearing member being adapted for access of pressurised fluid between the bore of the journal member and the shaft surface.

2. A bearing assembly as claimed in claim 1 wherein the journal bearing member comprises two annular sleeve portions.

3. A bearing assembly as claimed in claim 2 wherein the sleeve portions are disposed on either side of an annular flanged portion in the axial direction.

4. A bearing assembly as claimed in claim 2 wherein the journal bearing member is of unitary construction.

5. A bearing assembly as claimed in claim 2 wherein the journal bearing member comprises two distinct elements.

6. A bearing assembly as claimed in claim 5 wherein the two distinct elements each comprise an annular sleeve portion and a flange portion, said flange portions being adjacent.

7. A bearing assembly according to claim 6 wherein the two flange portions are of different diameters.

8. A bearing assembly as claimed in claim 5 wherein the two annular sleeve portions are of different diameters.

9. A bearing assembly as claimed in claim 2 wherein the two annular sleeve portions are of different diameters.

10. A bearing assembly as claimed in claim 1 wherein the journal bearing member is pre-loaded into a 'barrel' form in its free state.

11. A bearing assembly according to claim 1 wherein the journal bearing member is substantially cylindrical in its free state.

12. A bearing assembly as claimed in claim 1 wherein the journal bearing member is made of metal.

13. A bearing assembly as claimed in claim 1 wherein the journal bearing member is made of a plastics material.

* * * * *